(12) United States Patent
Shibayama et al.

(10) Patent No.: US 11,373,789 B2
(45) Date of Patent: Jun. 28, 2022

(54) FERRITE SINTERED BODY AND ELECTRONIC COMPONENT USING THEREOF

(71) Applicant: TDK CORPORATION, Tokyo (JP)

(72) Inventors: Takeshi Shibayama, Tokyo (JP); Yukio Takahashi, Tokyo (JP); Takashi Suzuki, Tokyo (JP); Hiroyuki Tanoue, Tokyo (JP); Masashi Shimoyasu, Tokyo (JP); Masahiro Kato, Yurihonjo (JP)

(73) Assignee: TDK CORPORATION, Tokyo (JP)

( * ) Notice: Subject to any disclaimer, the term of this patent is extended or adjusted under 35 U.S.C. 154(b) by 852 days.

(21) Appl. No.: 16/234,921

(22) Filed: Dec. 28, 2018

(65) Prior Publication Data

US 2019/0221344 A1 Jul. 18, 2019

(30) Foreign Application Priority Data

Jan. 17, 2018 (JP) .............................. JP2018-005571

(51) Int. Cl.
| | |
|---|---|
| *H01F 1/36* | (2006.01) |
| *H01F 17/04* | (2006.01) |
| *C04B 35/626* | (2006.01) |
| *H01F 17/00* | (2006.01) |
| *H01F 1/34* | (2006.01) |
| *C04B 35/26* | (2006.01) |
| *H01F 27/28* | (2006.01) |
| *H01F 27/40* | (2006.01) |
| *H01F 41/04* | (2006.01) |

(52) U.S. Cl.
CPC ............. *H01F 1/36* (2013.01); *C04B 35/265* (2013.01); *C04B 35/62685* (2013.01); *H01F 1/344* (2013.01); *H01F 17/0013* (2013.01); *H01F 17/04* (2013.01); *H01F 27/2804* (2013.01); *H01F 27/40* (2013.01); *H01F 41/043* (2013.01); *C04B 2235/3244* (2013.01); *C04B 2235/3274* (2013.01); *C04B 2235/3279* (2013.01); *C04B 2235/3281* (2013.01); *C04B 2235/3284* (2013.01); *C04B 2235/3409* (2013.01); *C04B 2235/3418* (2013.01); *C04B 2235/365* (2013.01); *C04B 2235/77* (2013.01); *C04B 2235/786* (2013.01); *C04B 2235/96* (2013.01); *H01F 2027/2809* (2013.01)

(58) Field of Classification Search
CPC .................. H01F 1/344; C04B 35/265; C04B 2235/3244; C04B 2235/3274; C04B 2235/3409; C04B 2235/3418; C04B 2235/786; C04B 2235/96
See application file for complete search history.

(56) References Cited

U.S. PATENT DOCUMENTS

| | | | | |
|---|---|---|---|---|
| 8,647,525 | B2 * | 2/2014 | Wada | ..................... H01F 1/344 |
| | | | | 252/62.59 |
| 2011/0226982 | A1 | 9/2011 | Wada et al. | |
| 2012/0126165 | A1 | 5/2012 | An et al. | |

FOREIGN PATENT DOCUMENTS

| | | | |
|---|---|---|---|
| JP | 2000-208316 | A | 7/2000 |
| JP | 3343813 | B2 | 11/2002 |
| JP | 2003-100508 | A | 4/2003 |
| JP | 2004-338997 | A | 12/2004 |
| JP | 2006-206415 | A | 8/2006 |
| JP | 4753016 | B2 | 8/2011 |
| JP | 2012-096952 | A | 5/2012 |

* cited by examiner

*Primary Examiner* — C Melissa Koslow
(74) *Attorney, Agent, or Firm* — Oliff PLC

(57) ABSTRACT

A ferrite sintered body of the invention includes; a main component including 48.65 to 49.45 mol % of iron oxide in terms of $Fe_2O_3$, 2 to 16 mol % of copper oxide in terms of CuO, 28.00 to 33.00 mol % of zinc oxide in terms of ZnO, and a balance including nickel oxide, and a subcomponent including boron oxide in an amount of 5 to 100 ppm in terms of $B_2O_3$ with respect to 100 parts by weight of the main component, in which the ferrite sintered body includes crystal grains having an average crystal grain size of 2 to 30 µm.

5 Claims, 2 Drawing Sheets

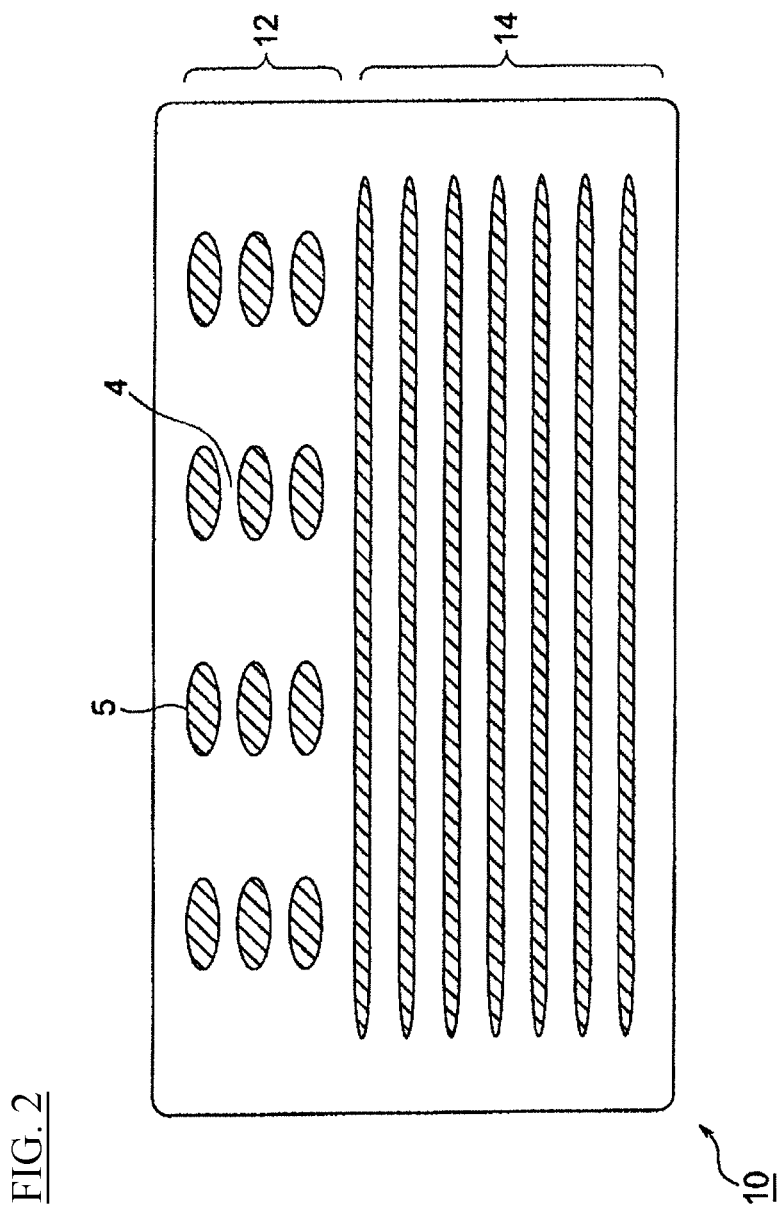

FERRITE SINTERED BODY AND ELECTRONIC COMPONENT USING THEREOF

BACKGROUND OF THE INVENTION

The present invention relates to a ferrite sintered body suitable for producing a multilayer inductor and the like and an electronic component having the ferrite sintered body.

In recent years, along with the development of automatic driving techniques and electric automobile, electrical installations in automobiles has been rapidly progressing. Electromagnetic interference control in a low frequency band of the electronic component is essential in the electrical installations in automobile. In addition, for the automobile uses, electronic component is required to withstand an environmental temperature exceeding 100° C. Considering these backgrounds, a multilayer electromagnetic interference suppression filter capable of withstanding the environmental temperature exceeding 100° C. is required.

A ferrite material applicable to the electromagnetic interference suppression filter is preferably high in a permeability and a Curie temperature. In addition, it is required that the ferrite material used for the electromagnetic interference suppression filter can be fired at a low temperature of about 900° C. A multilayer electronic component used for the electromagnetic interference suppression filter is produced by simultaneously firing the ferrite material and an internal electrode in order to improve productivity and reliability. In this case, if the ferrite material that can be fired at a low temperature is used, a material having a relatively low melting point can be used as the internal electrode.

Patent Document 1 discloses a ferrite material having a high permeability and a high Curie temperature by setting its composition within a predetermined range. However, in Patent Document 1, the high permeability is achieved by a grain growth at a relatively high firing temperature of 1000 to 1200° C. Therefore, when the ferrite material is simultaneously fired with the internal electrode having a low melting point, reliability may be reduced.

Patent Document 2 discloses a magnetic ferrite material including a glass. In addition, the firing temperature thereof is disclosed as 800 to 930° C. However, the magnetic ferrite material of Patent Document 2 contains $Na_2O$ derived from glass. $Na_2O$ suppresses grain growth during firing. Therefore, when the ferrite material of Patent Document 2 is used for the electromagnetic interference suppression filter for the automobile uses, the reliability may decrease.

Patent Document 3 discloses ferrite powder composed of Ni—Zn—Cu based ferrite powder and Zn—B based glass powder. Patent Document 3 discloses the permeability of the ferrite powder in the low frequency band, however, a higher performance is required in recent years.

Patent Document 1: JP 2004-338997 A
Patent Document 2: JP Patent 3343813
Patent Document 3: JP Patent 4753016

BRIEF SUMMARY OF INVENTION

The present invention has been made in view of the circumstances. An object of the present invention is to provide a ferrite material which can be fired at around 900° C. and has a high permeability and a high Curie temperature (Tc), and to provide an electronic component using thereof.

In order to achieve the objects above,
a ferrite sintered body of the invention includes;
a main component including 48.65 to 49.45 mol % of iron oxide in terms of $Fe_2O_3$, 2 to 16 mol % of copper oxide in terms of CuO, 28.00 to 33.00 mol % of zinc oxide in terms of ZnO, and a balance including nickel oxide, and a subcomponent including boron oxide in an amount of 5 to 100 ppm in terms of $B_2O_3$ with respect to 100 parts by weight of the main component, in which the ferrite sintered body includes crystal grains having an average crystal grain size of 2 to 30 μm.

The ferrite sintered body mentioned above preferably includes silicon oxide in an amount of 5 to 500 ppm in terms of $SiO_2$ with respect to 100 parts by weight of the main component as the subcomponent.

The ferrite sintered body mentioned above preferably includes zirconium oxide in an amount of 5 to 1100 ppm in terms of $ZrO_2$ with respect to 100 parts by weight of the main component as the subcomponent.

An electronic component of the invention includes the ferrite sintered body mentioned above.

The ferrite sintered body according to the invention is suitably used for such as a multilayer inductor, a multilayer L-C filter, a multilayer common mode filter, a composite electronic component by the other multilayer method, etc. The ferrite sintered body of the invention is also suitably used for such as LC composite electronic components, NFC coils, multilayer impedance elements, and multilayer transformers, etc.

According to the invention, it is possible to provide a ferrite material that can be fired at about 900° C. and has a high permeability and a high Curie temperature (Tc), and to provide an electronic component using thereof.

BRIEF DESCRIPTION OF THE DRAWINGS

FIG. 2 is a cross sectional view of an LC composite electronic component according to an embodiment of the invention.

DETAILED DESCRIPTION OF INVENTION

Figure 1:
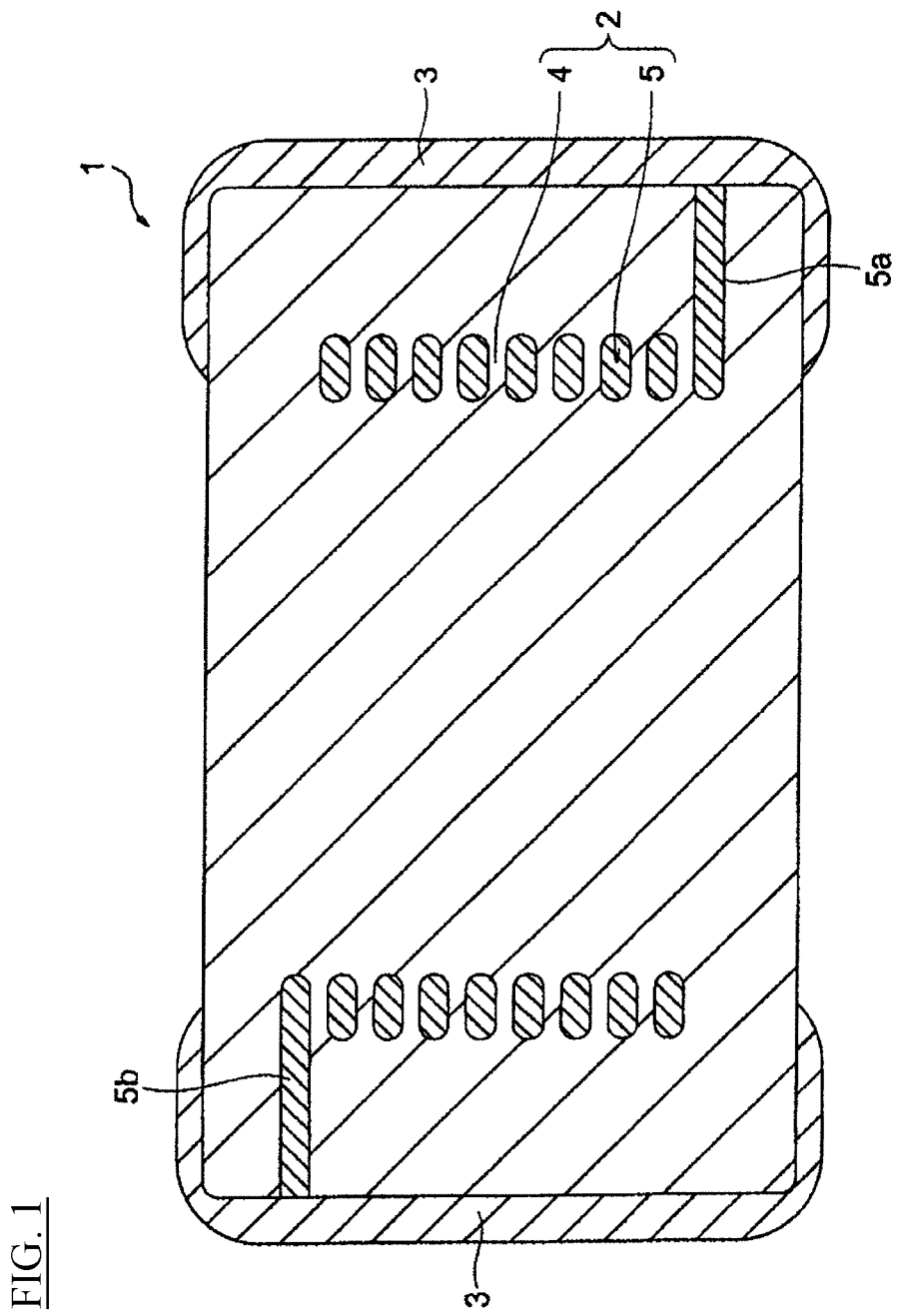
FIG. 1 is a cross sectional view of the multilayer inductor according to an embodiment of the invention.

Hereinafter, the invention will be described in detail based on embodiments shown in the drawings.

First, the multilayer inductor will be described as an embodiment of the electronic component according to the invention. As shown in FIG. 1, the multilayer inductor 1 according to an embodiment of the invention includes an element 2 and a terminal electrode 3. The element 2 is obtained by firing a green multilayer body in which the coil conductor 5 is formed three-dimensionally and spirally with the ferrite layer 4 interposed therebetween. The ferrite layer 4 includes a ferrite sintered body according to an embodiment of the invention. The multilayer inductor 1 is obtained by forming terminal electrodes 3 at both ends of the element 2 and connecting the terminal electrodes 3 via lead electrodes 5a and 5b. The shape of the element 2 is not particularly limited, but it is generally rectangular parallelepiped. In addition, its size is also not particularly limited, and it may be set appropriately according to the use.

Materials of the coil conductor 5 and the lead electrodes 5a and 5b are not particularly limited, and Ag, Cu, Au, Al, Pd, Pd/Ag alloy or the like is used. A Ti compound, a Zr compound, a Si compound, or the like may be added.

The ferrite sintered body according to the embodiment is a Ni—Cu—Zn based ferrite, and contains an iron oxide, a copper oxide, a zinc oxide and a nickel oxide as a main component.

The content of iron oxide in the main component of 100 mol % is 48.65 to 49.45 mol %, preferably 49.00 to 49.45 mol %, more preferably 49.10 to 49.30 mol %, and furthermore preferably 49.25 to 49.35 mol %, in terms of $Fe_2O_3$. By setting the content of the iron oxide within the above range, a ferrite sintered body having a high permeability can be obtained. When the content of iron oxide is too large, a sinterability decreases, and in particular, it is liable that a sintered density at low temperature sintering lowers and the electrical resistivity decreases. When the content of the iron oxide is too small, a high permeability may not be obtained.

The content of copper oxide in the main component of 100 mol % is 2 to 16 mol %, preferably 4 to 14 mol %, more preferably 6 to 12 mol %, furthermore preferably 8 to 10 mol % in terms of CuO. When the content of copper oxide is within the above range, a ferrite sintered body which can be fired at around 900° C. is obtained. When the content of the copper oxide is too small, the sinterability decreases and in particular, it is liable that the sintered density at low temperature sintering is lowered.

The content of zinc oxide in the main component of 100 mol % is 28.00 to 33.00 mol %, preferably 28.50 to 32.00 mol %, more preferably 29.00 to 31.00 mol %, and furthermore preferably 29.90 to 30.20 mol % in terms of ZnO. A ferrite sintered body having a high Curie temperature (Tc) and a high permeability can be obtained by setting the content of zinc oxide within the above range. As the content of zinc oxide increases, the initial permeability tends to increase. And as the initial permeability increases, it becomes suitable for an inductor. However, when the content of zinc oxide is too large, the Curie temperature tends to decrease.

Balance of the main component includes nickel oxide.

In addition to the above main component, the ferrite sintered body according to the embodiment may contain boron oxide and may further contain compounds such as silicon oxide and zirconium oxide as a subcomponent.

The content of boron oxide is 5 to 100 ppm, preferably 5 to 85 ppm, more preferably 5 to 60 ppm, furthermore preferably 10 to 50 ppm in terms of $B_2O_3$ with respect to 100 parts by weight of the main component. When the content of boron oxide is within the above range, a ferrite sintered body having a high permeability can be obtained. When the content of boron oxide is too large, it is liable that grain growth is suppressed at firing and permeability is lowered.

The content of silicon oxide is preferably 5 to 500 ppm, more preferably 5 to 350 ppm, furthermore preferably 5 to 200 ppm in terms of $SiO_2$ with respect to 100 parts by weight of the main component. When the content of silicon oxide is within the above range, a ferrite sintered body having superior sinterability can be obtained. When the content of silicon compound is too large, the sinterability deteriorates, and in particular, it is liable that the sintered density at low temperature sintering lowers.

The content of zirconium oxide is preferably 5 to 1100 ppm, more preferably 5 to 900 ppm, furthermore preferably 5 to 700 ppm in terms of $ZrO_2$ with respect to 100 parts by weight of the main component. When the content of zirconium oxide is within the above range, a ferrite sintered body having superior sintering properties and a high permeability can be obtained.

In the ferrite sintered body according to the embodiment, the content of each component of the main component is being controlled within the above ranges, and a compound such as boron oxide is contained as the subcomponent within the predetermined range. As a result, the sintering temperature can be lowered, and a relatively low melting point metal such as Ag can be used as the internal conductor to be simultaneously fired. Furthermore, the ferrite sintered body obtained by the low temperature firing has a high initial permeability and a high Curie temperature Tc.

The ferrite sintered body according to the embodiment may further contain additional components such as a manganese oxide such as $Mn_3O_4$, tin oxides, magnesium oxides, glass compounds and the like in addition to the above-mentioned subcomponents within a range that does not inhibit the effect of the invention. The content of these additional components is not particularly limited but is, for example, approximately 0.05 to 10 wt %.

Furthermore, the ferrite composition according to the embodiment may contain inevitable impurity elements or oxides thereof.

Specifically, examples of inevitable impurity elements include C, S, Cl, As, Se, Br, Te, I, typical metal elements such as Li, Na, Mg, Al, Ca, Ga, Ge, Sr, Cd, In, Sb, Ba, Pb, and transition metal elements such as Sc, Ti, V, Cr, Y, Nb, Mo, Pd, Ag, Hf, Ta and the like. Further, an oxide of inevitable impurity element may be contained in the ferrite composition as long as it is approximately 0.05wt % or less.

In particular, When Na is contained in a large amount, grain growth during sintering is suppressed, and permeability may he lowered. Therefore, it is preferable that the content of Na is 200 ppm or less in terms of NaO.

In the ferrite sintered body according to the embodiment, an average crystal grain size of the crystal grains is 2 to 30 μm, preferably 3 to 20 μm, and more preferably 4 to 10 μm.

The average crystal grain size is a median size (D50 grain size, 50% grain size) in the volume distribution calculated from the crystal grain size of a predetermined number of crystal grains. Specifically, the cut surface of the ferrite sintered body, appropriately treated by chemical etching or the like as necessary, is observed with such as an optical microscope or SEM, and the volume distribution is calculated from the crystal grain size of a predetermined number of crystal grains. The grain size of each crystal grain can be obtained as a circle equivalent diameter (Haywood diameter) assumed to he a circle corresponding to the area of each crystal grain. The number of grains to be measured for the average crystal grain size is usually 100 or more.

The density of the ferrite sintered body according to the embodiment is preferably 4.90 to 5.30 $g/cm^3$, more preferably 5.00 to 5.30 $g/cm^3$, and furthermore preferably 5.10 to 5.30 $g/cm^3$.

The density of the ferrite sintered body is calculated from the size and weight of the sintered body obtained by firing a disc shaped green body at 900° C.

The Curie temperature Tc of the ferrite sintered body according to the embodiment is preferably 100° C. or more, more preferably 125° C. or more, and furthermore preferably 150° C. or more The Curie temperature Tc is measured according to JIS-C-2560-1 and 2.

The specific resistance ρ of the ferrite sintered body according to the embodiment is preferably $10^6$ Ω·m or more, more preferably $10^7$ Ω·m or more, and furthermore preferably $10^8$ Ω·m or more.

The specific resistance ρ can be obtained by measuring the DC resistance value of the ferrite sintered body to which an In—Ga electrode is attached. The specific resistance ρ can be measured using an IR meter.

The permeability μ' of the ferrite sintered body according to the embodiment at a frequency of 100 kHz is preferably 1000 or more, more preferably 1100 or more, and furthermore preferably 1200 or more.

The permeability μ' is measured by winding a copper wire for 10 turns on a toroidal core shaped ferrite sintered body. Permeability μ' can be measured using an LCR meter. The measurement conditions are a frequency of 100 kHz and a temperature of 25° C.

Next, an example of a production method of a ferrite sintered body according to the embodiment will be described. First, the starting materials (the raw materials of the main component and the same of the subcomponent) are weighed and mixed so as to have a predetermined compositional ratio to obtain a raw material mixture. As a method of mixing, for example, a wet mixing performed using a ball mill or a dry mixing performed using a dry mixer can be mentioned. It is preferable to use the starting material having the average grain size of 0.05 to 1.0 μm.

As the raw material of the main component, iron oxide (α-$Fe_2O_3$), copper oxide (CuO), zinc oxide (ZnO), nickel oxide (NiO), a complex oxide or the like can be used. In addition, various compounds and the like which become oxides or complex oxides described above by firing can be used. Examples of substances that can be converted into oxides described above by firing include such as metal simple substances, carbonates, oxalates, nitrates, hydroxides, halides, organometallic compounds, and the like.

Glass having boron oxide and low softening point can be used as a raw material for the subcomponent. B—Zn—Si based glass can be used as the glass. B—Zn—Si based glass may contain zinc oxide, silicon oxide, and other minor components, in addition to boron oxide. Some of the components contained in the glass may be lost in a calcination process and a firing process mentioned below.

Next, the raw material mixture is calcined to obtain a calcined material, Calcination causes a thermal decomposition of raw materials, a homogenization of components, a formation of the ferrite, a disappearance of the ultrafine powder, and a grain growth to an appropriate grain size, and converts the raw material mixture into a form suitable for the subsequent processes. The calcination is preferably carried out at a temperature of 500 to 900° C., usually for about 2 to 15 hours. The Calcination is usually performed in an atmospheric air (air), but it may be performed in an atmosphere with a lower oxygen partial pressure than in the atmospheric air. The raw material of the main component and the same of the subcomponent can be mixed before or after the calcination.

Next, the calcined material is pulverized to obtain a pulverized material. The pulverization is carried out in order to crack the aggregation of the calcined material to obtain a powder having an appropriate sinterability. When the calcined material forms large lumps, a coarse pulverization is carried out and then a wet pulverization is carried out using a ball mill, attritor or the like. The wet pulverization is carried out until the average grain size of the pulverized material is preferably about 0.1 to 1.0 μm.

Using the obtained pulverized material, the multilayer inductor of the embodiment is produced. Although there is no restriction on the method of producing the multilayer inductor, the sheet method will be described below.

First, the obtained pulverized material. is slurried together with additives such as a solvent and a binder to prepare a paste. Then, the paste is used to form a green sheet. Subsequently, the formed green sheet is machined into a predetermined shape and is subjected to a binder removing step and a firing step. Thus, a multilayer inductor 1 in which a coil conductor 5 is three-dimensionally formed in a spiral shape via the ferrite layer 4 as shown in FIG. 1 is obtained. The ferrite layer 4 is composed of a ferrite sintered body according to an embodiment of the invention. Firing is performed at a temperature equal to or lower than the melting point of the coil conductor 5 and the extraction electrodes 5a and 5b. For example, when the coil conductor 5 and the lead electrodes 5a, 5b are Ag (a melting point of 962° C.), the temperature is preferably 850° C. to 920° C. The firing time is usually about 1 to 5 hours. In addition, the firing may be performed in the atmospheric air (air), but it may be performed in an atmosphere with a lower oxygen partial pressure than in the atmospheric air. Then, the terminal electrodes 3 are formed at both ends of the element 2, and the multilayer inductor 1 is obtained by connecting to the terminal electrode 3 via the lead electrodes 5a and 5b.

Although embodiments of the invention have been described above, the invention is not limited thereto. And the invention can be implemented in various modes without deviating from the gist of the invention. For example, the ferrite composition of the invention may be used as the ferrite layer 4 in the LC composite electronic component 10 shown in FIG. 2. In FIG. 2, a portion denoted by reference 12 is an inductor part, and a portion denoted by reference 14 is a capacitor part.

EXAMPLE

Hereinafter, the invention will be described based on more detailed examples, however, the invention is not limited thereto.

First, $Fe_2O_3$, NiO, CuO, and ZnO were prepared as raw materials for the main component. B—Zn—Si based glass was prepared as a raw material for the subcomponent.

Next, the prepared main component was weighed so as to have the composition shown in Table 1 as the sintered body, and then wet-mixed with a ball mill for 16 hours to obtain a raw material mixture.

Next, after drying the obtained raw material mixture, it was calcined in air at 500° C. to 900° C. to obtain calcined powder. The calcined powder and the raw material powder of the subcomponent were wet pulverized in a steel ball mill for 72 hours to obtain pulverized powder.

Next, after the pulverized powder was dried, 10.0 parts by weight of a 6 wt % aqueous solution of polyvinyl alcohol as the binder was added to 100 parts by weight of the pulverized powder and granulated to prepare granules. The granules were pressured to obtain a green body having a toroidal shape (size=outer diameter 13 mm×inner diameter 6 mm×height 3 mm) and a disk shape (size=outer diameter 12 mm×height 2 mm), so as to obtain 3.20 $Mg/m^3$ density of a green body.

Next, these green bodies were fired in air at 900° C., which is not higher than the melting point (962° C.) of Ag, for 2 hours to obtain a toroidal core sample of a sintered body. Further samples were subjected to the following properties evaluation. The test results are shown in Table 1. Sample No. underlined are comparative examples.

Average Crystal Grain Size

The cross section of the ferrite sintered body was appropriately treated by chemical etching or the like when necessary and observed with an optical microscope or SEM to calculate the volume distribution from the crystal grain size of 100 or more crystal grains. The median size (D50 grain size, 50% grain size) in the volume distribution was determined as the average crystal grain size. The grain size of each crystal grain was calculated based on the circle equivalent diameter (Haywood diameter) assumed to be a circle corresponding to the area of each crystal grain.

Measuring Contents of the Ingredient

The contents of the components contained in the sample were measured using a X-ray fluorescent (XRF) for Fe, Cu, Zn and Ni and ICP atomic emission spectroscopy (ICP-AES) or ICP mass spectrometer (ICP-MS) for B, Si and Zr. The content of each component described in Table 1 is a value in terms of $Fe_2O_3$, CuO, ZnO, NiO, $B_2O_3$, $SiO_2$, and $ZrO_2$, respectively.

Density

The density of the ferrite sintered body was calculated from size and weight of the sintered body obtained by firing the disk shaped green body at 900° C.

Permeability μ'

Copper wire was wound around the toroidal core sample for 10 turns, and the permeability μ' was measured using an LCR meter (4285A produced by Hewlett-Packard Company). The measurement conditions were a measurement frequency of 100 kHz and a measuring temperature of 25° C.

Specific Resistance ρ

In—Ga electrodes were coated on both sides of the disk sample, the DC resistance value was measured, and the specific resistance ρ was obtained (unit: Ω·m). The measurement was carried out using an IR meter (4329A, produced by HEWLETT PACKARD CD., LTD.).

Curie Temperature (Tc)

Curie temperature Tc was measured according to JIS-C-2560-1 and 2.

TABLE 1

| Sample No. | $Fe_2O_3$ (mol %) | NiO (mol %) | CuO (mol %) | ZnO (mol %) | $SiO_2$ (ppm) | $B_2O_3$ (ppm) | $ZrO_2$ (ppm) | Average crystal grain size (μm) | Firing temperature (° C.) | Density (g/cm³) | μ' [100 kHz] | ρ (Ωm) | Tc (° C.) |
|---|---|---|---|---|---|---|---|---|---|---|---|---|---|
| 1 | 48.70 | 11.68 | 9.60 | 30.02 | 120 | 32 | | 4.0 | 900 | 5.29 | 1028 | 3.4.E+09 | |
| 2 | 48.94 | 11.51 | 9.59 | 29.96 | 242 | 29 | | 5.0 | 900 | 5.29 | 1189 | 3.3.E+09 | |
| 3 | 49.05 | 11.47 | 9.56 | 29.92 | 228 | 30 | | 5.2 | 900 | 5.27 | 1260 | 2.7.E+08 | |
| 4 | 49.11 | 11.49 | 9.50 | 29.89 | 139 | 27 | | 5.5 | 900 | 5.27 | 1280 | 1.0.E+10 | |
| 5 | 49.24 | 11.21 | 9.59 | 29.97 | 241 | 43 | | 6.0 | 900 | 5.25 | 1300 | 3.2.E+09 | |
| 6 | 49.31 | 11.12 | 9.49 | 30.08 | 110 | 30 | | 6.9 | 900 | 5.26 | 1375 | 5.8.E+09 | |
| 7 | 49.37 | 11.43 | 9.50 | 29.70 | 135 | 16 | | 5.4 | 900 | 5.30 | 1275 | 3.2.E+09 | |
| 8 | 49.45 | 11.14 | 9.50 | 29.91 | 234 | 31 | | 4.3 | 900 | 5.24 | 1078 | 9.9.E+09 | |
| 9 | 49.56 | 11.10 | 9.52 | 29.82 | 150 | 33 | | 1.9 | 900 | 5.12 | 790 | 1.5.E+08 | |
| 10 | 49.63 | 11.14 | 9.49 | 29.74 | 99 | 33 | | 1.5 | 900 | 5.17 | 478 | 4.0.E+06 | |
| 11 | 49.71 | 10.88 | 9.55 | 29.86 | 140 | 27 | | 1.1 | 900 | 4.89 | 230 | 3.4.E+05 | |
| 12 | 48.60 | 11.78 | 9.60 | 30.02 | 110 | 25 | | 2.9 | 900 | 5.28 | 902 | 4.0.E+09 | |
| 13 | 49.28 | 9.32 | 8.40 | 33.00 | 121 | 35 | | 10.0 | 900 | 5.18 | 1477 | 1.8.E+09 | 105 |
| 14 | 49.41 | 12.09 | 9.50 | 29.00 | 133 | 23 | | 4.6 | 900 | 5.19 | 1125 | 2.3E+09 | 175 |
| 15 | 49.44 | 13.08 | 9.48 | 28.00 | 128 | 22 | | 4.0 | 900 | 5.19 | 1001 | 3.5E+09 | 200 |
| 16 | 49.30 | 18.70 | 2.00 | 30.00 | 120 | 19 | | 4.0 | 900 | 5.01 | 1004 | 7.1.E+09 | |
| 17 | 49.30 | 4.70 | 16.00 | 30.00 | 140 | 27 | | 4.1 | 900 | 5.29 | 1010 | 9.9.E+09 | |
| 18 | 49.14 | 11.48 | 9.54 | 29.84 | 76 | 0 | | 1.9 | 900 | 5.28 | 809 | 3.9.E+09 | |
| 19 | 49.15 | 11.45 | 9.44 | 29.96 | 201 | 101 | | 4.3 | 900 | 5.24 | 1073 | 1.1.E+10 | |
| 20 | 49.38 | 11.42 | 9.45 | 29.75 | 150 | 80 | | 4.9 | 900 | 5.21 | 1173 | 6.1.E+09 | |
| 21 | 49.20 | 11.50 | 9.40 | 29.90 | 80 | 5 | | 4.1 | 900 | 5.29 | 1010 | 9.1.E+09 | |
| 22 | 49.27 | 11.18 | 9.55 | 30.00 | 5 | 20 | | 8.0 | 900 | 5.2 | 1490 | 2.9.E+09 | |
| 23 | 49.34 | 11.20 | 9.48 | 29.98 | 504 | 30 | | 4.2 | 900 | 5.15 | 1021 | 2.1.E+09 | |
| 24 | 49.28 | 11.30 | 9.50 | 29.92 | 123 | 23 | 5 | 7.0 | 900 | 5.29 | 1401 | 6.7.E+09 | |
| 25 | 49.35 | 11.11 | 9.45 | 30.09 | 111 | 22 | 1020 | 4.0 | 900 | 5.1 | 1001 | 8.9.E+09 | |

From Table 1, it was found that the ferrite sintered bodies (Sample Nos. 1 to 8, 13 to 17, and 20 to 25) including 48.65 to 49.45 mol % of iron oxide in terms of $Fe_2O_3$, 2 to 16 mol % of copper oxide in terms of CuO, 28.00 to 33.00 mol % of zinc oxide in terms of ZnO, and 5 to 100 ppm of boron oxide in terms of $B_2O_3$, showed a superior permeability at 100 kHz.

On the other hand, when the content of iron oxide was out of the range of 48.65 to 49.45 mol % in terms of $Fe_2O_3$ (sample Nos. 9 to 12), the permeability at 100 kHz decreased. In addition, the permeability at 100 kHz decreased when the content of boron oxide was less than 5 ppm in terms of $B_2O_3$ (Sample No. 18), and the specific resistance ρ decreased when the content was greater than 100 ppm (Sample No. 19).

DESCRIPTION OF THE REFERENCE NUMERAL

1 . . . Multilayer inductor
2 . . . Element
3 . . . Terminal electrode
4 . . . Ferrite layer
5 . . . Coil conductor
  5a, 5b . . . Extraction electrode
10 . . . LC composite electronic component
12 . . . inductor part
14 . . . capacitor part

What is claimed is:

1. A ferrite sintered body comprising;
   a main component including 48.65 to 49.45 mol % of iron oxide in terms of $Fe_2O_3$, 2 to 16 mol % of copper oxide in terms of CuO, 28.00 to 33.00 mol % of zinc oxide in terms of ZnO, and a balance comprising nickel oxide, and
   a subcomponent including boron oxide in an amount of 5 to 100 ppm in terms of $B_2O_3$ with respect to 100 parts by weight of the main component, wherein
   the ferrite sintered body comprises crystal grains having an average crystal grain size of 2 to 30 μm.

2. The ferrite sintered body according to claim 1, wherein the subcomponent comprises silicon oxide in an amount of 5 to 500 ppm in terms of $SiO_2$ with respect to 100 parts by weight of the main component.

3. The ferrite sintered body according to claim 1, wherein the subcomponent comprises zirconium oxide in an amount of 5 to 1100 ppm in terms of $ZrO_2$ with respect to 100 parts by weight of the main component.

4. The ferrite sintered body according to claim 2, wherein the subcomponent comprises zirconium oxide in an amount of 5 to 1100 ppm in terms of $ZrO_2$ with respect to 100 parts by weight of the main component.

5. An electronic component comprising the ferrite sintered body according to claim 1.

* * * * *